(12) United States Patent
Burkart et al.

(10) Patent No.: US 11,898,978 B2
(45) Date of Patent: Feb. 13, 2024

(54) SENSOR SYSTEM FOR FLUIDS

(71) Applicant: STRATEC SE, Birkenfeld (DE)

(72) Inventors: Michael Burkart, Waldbornn (DE); Ralf Maier, Karlsbad (DE)

(73) Assignee: STRATEC SE, Birkenfeld (DE)

( * ) Notice: Subject to any disclaimer, the term of this patent is extended or adjusted under 35 U.S.C. 154(b) by 0 days.

(21) Appl. No.: 17/951,852

(22) Filed: Sep. 23, 2022

(65) Prior Publication Data
US 2023/0142205 A1    May 11, 2023

(30) Foreign Application Priority Data
Nov. 8, 2021   (LU) ........................................ 102872

(51) Int. Cl.
*G01N 27/07* (2006.01)
*G01N 27/04* (2006.01)

(52) U.S. Cl.
CPC ........... *G01N 27/07* (2013.01); *G01N 27/046* (2013.01)

(58) Field of Classification Search
CPC .... G01N 21/552; G01N 21/431; G01N 21/43; G01N 2201/0245; G01N 2021/434; G01N 2030/645; G01N 27/07; G01N 27/046; G01F 23/268; B01F 35/2115; B01F 35/2112; B01F 35/2133; G05D 11/135
USPC .................................................. 324/693, 722
See application file for complete search history.

(56) References Cited

U.S. PATENT DOCUMENTS

| | | | |
|---|---|---|---|
| 10,677,725 B2 * | 6/2020 | Pizzi ...................... | G01K 13/02 |
| 11,079,327 B2 * | 8/2021 | Pizzi ..................... | G01N 21/552 |
| 11,400,194 B2 * | 8/2022 | Brugger ............... | B01F 33/848 |
| 11,654,219 B2 * | 5/2023 | Brugger ............. | A61M 1/1656 |
| | | | 210/636 |
| 2009/0012452 A1 * | 1/2009 | Slepicka ............. | A61M 1/1524 |
| | | | 604/29 |
| 2019/0056321 A1 * | 2/2019 | Pizzi ....................... | G01F 23/26 |
| 2020/0171230 A1 * | 6/2020 | Brugger ............... | B01F 35/715 |
| 2020/0240914 A1 * | 7/2020 | Pizzi ...................... | G01N 21/43 |
| 2022/0296792 A1 * | 9/2022 | Brugger ............. | A61M 1/1601 |

(Continued)

FOREIGN PATENT DOCUMENTS

| | | | | |
|---|---|---|---|---|
| CN | 109073439 A | * | 12/2018 | ............ F01N 11/007 |
| CN | 115876246 A | * | 3/2023 | |
| DE | 102020120921 A1 | * | 2/2022 | |

(Continued)

*Primary Examiner* — Jermele M Hollington
*Assistant Examiner* — Sean Curtis
(74) *Attorney, Agent, or Firm* — 24IP Law Group USA, PLLC; Timothy R DeWitt

(57) ABSTRACT

A sensor system, particularly for monitoring the mixing of at least two fluids and a method for monitoring the mixture of at least two liquids. The present invention provides a sensor system for fluids, comprising at least two level sensor which are arranged vertically one upon the other on and connected to an electronic circuit board, four electrodes of four conductivity sensors which are arranged horizontally next to each other at the bottom of and connected to the electronic circuit board; and a temperature sensor which is connected to the electronic circuit board; a connector for connecting the electronic circuit board to a controller; wherein the electronic circuit board is embedded in a hot melt compound which is surrounded by an injection molded housing.

10 Claims, 2 Drawing Sheets

(56) References Cited

U.S. PATENT DOCUMENTS

| 2023/0142205 A1* | 5/2023 | Burkart | G01N 27/07 |
| | | | 324/693 |
| 2023/0241299 A1* | 8/2023 | Brugger | G01R 27/22 |
| | | | 210/636 |

FOREIGN PATENT DOCUMENTS

| EP | 4177698 A1 * | 5/2023 | G01N 27/046 |
| WO | 2006113177 A2 | 10/2006 | |
| WO | WO-2017149476 A2 * | 9/2017 | G01N 21/43 |
| WO | 2018237376 A1 | 12/2018 | |
| WO | WO-2018237376 A1 * | 12/2018 | A61M 1/1601 |

* cited by examiner

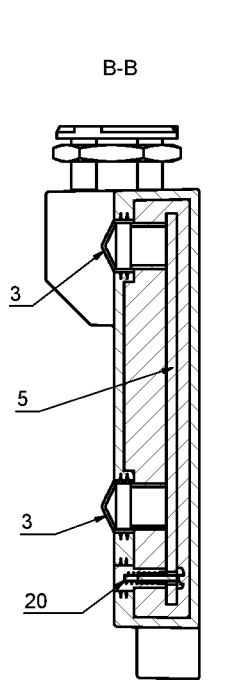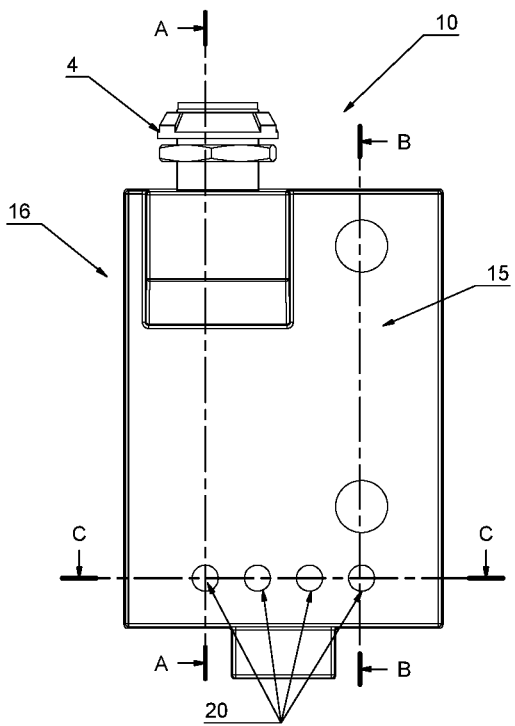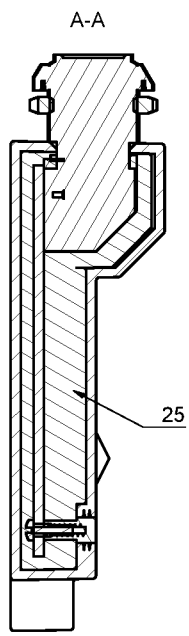
FIG. 1C FIG. 1A FIG. 1B
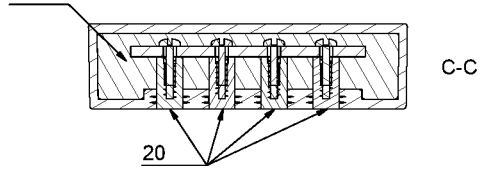
FIG. 1D
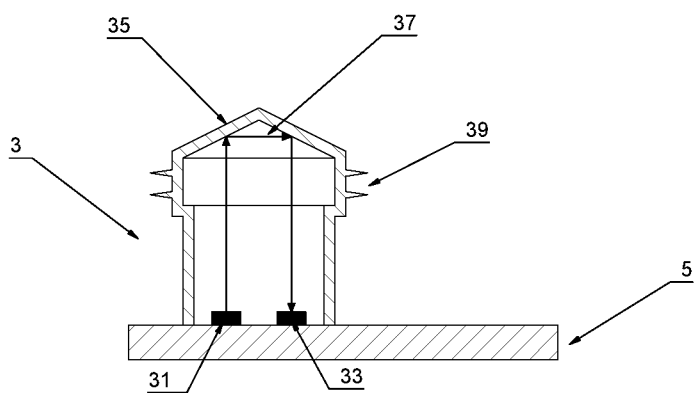
FIG. 2

SENSOR SYSTEM FOR FLUIDS

CROSS-REFERENCE TO RELATED APPLICATIONS

The present application claims priority to Luxembourg Patent Application No. LU 102872 filed on Nov. 8, 2021. The aforementioned application is hereby incorporated by reference in its entirety.

BACKGROUND OF THE INVENTION

Field of the Invention

The invention relates to a sensor system, particularly for monitoring the mixing of at least two fluids.

Brief Description of the Related Art

Automated analyser systems for use in clinical diagnostics and life sciences are produced by a number of companies. For example, STRATEC® SE, Birkenfeld, Germany, produces a number of devices for specimen handling and detection for use in automated analyser systems and other laboratory instrumentation.

STRATEC® designs and manufactures automated analytical systems in the field of in vitro diagnostics (IVD), which use a number of individual instrument components to process diagnostic assays. Wash buffer which are aqueous solutions are required in automated analyser systems for processing samples, among other things.

These solutions (mainly sodium chlorite or potassium chlorite solutions with surfactants) can either be supplied ready-mixed to the instrument or mixed on the instrument from a concentrate and water. When mixing in the unit, both concentrate and water are each supplied into a container by a pump, e.g., a peristaltic pump. In order to keep the mixing ratio constant within the specified limits and to be able to detect failures or faulty delivery rates of a pump, a sensor is necessary for monitoring and/or control.

Solutions for washing purposes in an automated analyser system may be prepared outside the system under controlled conditions, either manually, with very precise pumps, or e.g., by weighing the individual components. This approach requires additional facilities for preparing and providing the required solutions.

Alternatively, very precise conductivity sensors which have been developed for process technology are available in the field. These sensors are also usually mechanically very robust which results in an increased weight and size. Said sensors usually measure the conductivity of the liquid by means of metallic electrodes that are immersed in the liquid, alternatively there are also inductive sensors. With these, an electrical voltage is coupled into the liquid by means of a coil and the resulting current flow in the liquid is measured with a second coil.

The use of premixed buffer solutions is disadvantageous with respect to their storage because the solutions are water based. When mixing a buffer on the unit from a concentrate and water, a mixing ratio of concentrate and water between 1:10 and 1:20 is commonly used.

The sensors available in the field are either too large or too expensive or both for (serial) use in diagnostic devices. In addition, the use of metallic electrodes in process liquids of analytical instruments is not desired, since interactions with the liquid may occur and thus influence the results of the analysis.

Published U.S. patent application US 2019/056321 A1 discloses an integrated in a sensor device, wherein a plurality of detection arrangements of various types, comprising at least a level-sensing arrangement and an optical arrangement for detection of one or more characteristics of the substance, and possibly also a temperature-sensing arrangement, with these arrangements that are operatively associated to one and the same casing or assembly body. The arrangement and the number of the sensors of a device according to US 2019/056321 A1 appear to be disadvantageous in terms of making the device complex.

Published International application WO 2018/237376 A1 relates to a medicament preparation system which includes a disposable cartridge with a flow path. Various sensors may be placed on the cartridge to measure qualities of the fluid flowing through the flow path. The sensors are placed in precise locations using various approaches that make manufacturing of the cartridge efficient and repeatable. A drain line that is susceptible to fouling may be pre-attached and various approaches are used to remove or reduce the fouling. An elastomeric contact can also be present in the medical preparation system and used in a conductivity measurement subsystem.

Published U.S. patent application US 2009/012452 A1 teaches an dialysis system instrument which includes a dialysis instrument, a disposable pumping and valving cassette apparatus operable with pumping and valving actuators of the dialysis instrument, the disposable cassette including an electronic cell and electronics associated with the electronic cell, the electronics configured to determine an electrical property of a solution flowing through the electronic cell of the disposable apparatus.

Published International patent application WO 2006/113177 A2 discloses various improvements in the field of surface plasmon resonance (SPR) sensing systems. One improvement relates to a portable SPR sensing system, e.g., a system contained within a suitcase that can be hand-carried to a monitoring site. Another improvement relates to a portable, cartridge based SPR sensing system. In this system, selected portions of the system's electrical and fluidics systems are allocated between a base unit and a removable/disposable cartridge. Other improvements relate to methods or protocols for operating an SPR sensing system. Such methods provide for the elimination of false positives and increased sensitivity, e.g., by using secondary antibodies with specificity for different target epitopes and by sensor element redundancy. In addition, protocols are provided for the detection of small molecules. Such protocols may employ a competition type assay where the presence of the analyte inhibits the binding of antibodies to surface immobilized analyte, or a displacement assay, where antibodies bound to the analyte on the sensor surface are displaced by free analyte.

There is a need for a sensor for monitoring that a mixture comprises the intended parts of a solution.

SUMMARY OF THE INVENTION

It is therefore the object of this invention to provide a sensor for monitoring the preparation of a solution.

The present invention provides a sensor system for fluids, comprising
two level sensors which are arranged vertically one upon the other on and connected to an electronic circuit board,
four electrodes of four conductivity sensors which are arranged horizontally next to each other at the bottom of and connected to the electronic circuit board, wherein the four conductivity sensors are arranged below the lower level sensor; and a temperature sensor which is connected to the electronic circuit board;

a connector for connecting the electronic circuit board to a controller;

wherein the electronic circuit board is embedded in a hot melt compound which is surrounded by an injection molded housing.

In a further aspect of the sensor system all sensors are made of a conductive plastic.

In another embodiment of the sensor system, the two outer electrodes of the conductivity sensors apply a defined current and the two inner electrodes conductivity sensors measure the current for determining the conductivity of the fluid.

In another embodiment of the sensor system, the at least two level sensors are optical sensors.

It may further be envisaged that each tip of the at least two level sensors is made of a transparent material The tip of a level sensor can be a prism.

The system according to the invention may further encompass that the temperature sensor is located below the conductivity sensor.

It is further envisaged that the temperature sensor is thermally insulated from the injection molded housing.

Another object of the invention is a method for monitoring the mixture of fluids, comprising the steps of
Providing at least two fluids in a container;
Mixing the liquids;
Measuring conductivity, fluid level and temperature of the mixture with a sensor system for fluids, comprising at least two level sensor which are arranged vertically one upon the other on and connected to an electronic circuit board, four electrodes of the conductivity sensors which are arranged horizontally next to each other at the bottom of and connected to the electronic circuit board; and a temperature sensor which is connected to the electronic circuit board; a connector for connecting the electronic circuit board to a controller, wherein the electronic circuit board is embedded in a hot melt compound which is surrounded by an injection molded housing
Determining whether the conductivity is in a pre-defined range.

The method may further comprise the step of adjusting the ratio of the two liquids according to the determined conductivity if the measured conductivity is outside the pre-defined range.

Still other aspects, features, and advantages of the present invention are readily apparent from the following detailed description, simply by illustrating preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE FIGURES

The invention will be described based on figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

FIGS. 1A-1D show a sensor according to the invention in different views.

FIG. 2 shows a sectional view through a level sensor.

DETAILED DESCRIPTION OF THE INVENTION

Figures 3A, 3B:
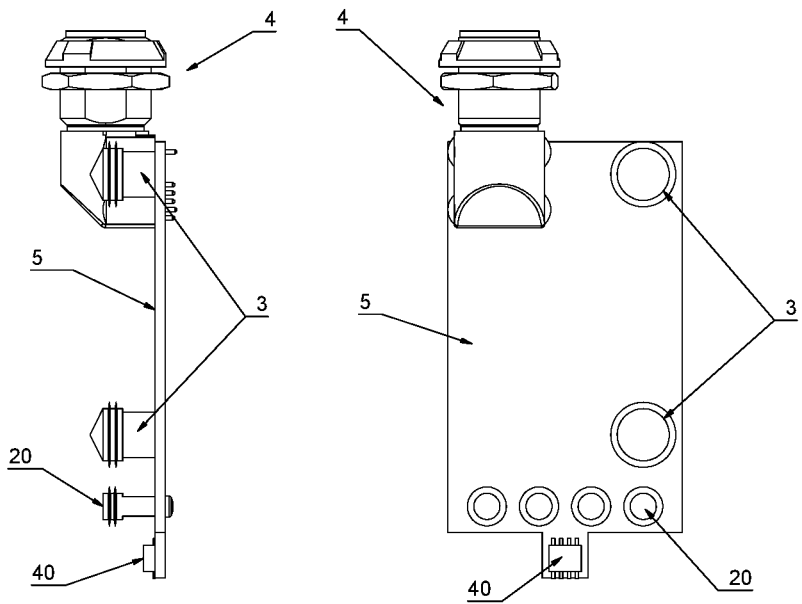
FIGS. 3A-3C show the electronic circuit board without injection molded housing and hot melt compound in a side view (left) and front view (right).

The technical problem is solved by the independent claims. The dependent claims cover further specific embodiments of the invention.

A fluid within the meaning of the present disclosure relates to a liquid which may comprise solid or gaseous compounds. The term controller shall be understood within the meaning of the present invention as a device that is able to receive and send electronic signals from or to the sensor system. Thus, a controller can also be an automated analyser system to which the sensor system is connected. The connector of a sensor system according to the present disclosure may also be used for connecting several sensor systems.

The present disclosure provides a low-cost sensor for analytical instruments. The sensor uses electrodes made of conductive plastic for measuring the conductivity instead of the commonly used metal electrodes. The sensor further comprises level sensors for monitoring the filling level in the container and a temperature sensor.

The sensors of a device according to the present disclosure are arranged in a very specific manner to obtain a reliable sensing but keep the complexity and costs of the device low. In comparison to the device which is disclosed in US 2019/056321 A1 the number of sensors is minimized in a device according to the present invention and said prior art document does not guide a skilled person to the chosen arrangement of sensors of a device of the present invention. In particular, the device of US 2019/056321 A1 provides four connectors for the circuit board. Said place of the PCB is used in a device according to the present invention for the four horizontally arranged conductivity sensors, so that the arrangement of the sensors according to the present invention would not be possible coming from a device according to US 2019/056321 A1 as a starting point.

The conductivity sensor of a sensor according to the present disclosure is based on the use of four electrodes which are arranged in a horizontal row of all four sensors next to another (four-wire measuring technique). The conductivity sensors are arranged below the lower level sensor of the two vertically above another arranged level sensors. Such an arrangement guarantees that the conductivity sensors are only used when they are covered by a liquid, which is the case when the lower level sensor detects a liquid.

A defined current is applied to the liquid via the two outer electrodes (conductivity sensors), and the voltage generated by the current flow is measured with high resistance using the two inner electrodes (conductivity sensors). An advantage of this arrangement of the electrodes and their use is that the results of measurements are not distorted by the electrical resistance of the electrodes themselves.

The level sensors of a sensor according to the present disclosure operate optically according to the total reflection principle. Light is emitted into a tip of the sensor. The tip of the sensor is made of a transparent material and the inner surfaces of the tip are angled in a manner so that the emitted light is reflected onto a receiver if there is air around the transparent tip of the sensor (total internal reflection). However, if a liquid is surrounding the tip of the sensor, the light exits the sensor, and the receiver will not receive reflected light.

At least two of such level sensors are provided, one may detect a minimum liquid level at which the conductivity electrodes are guaranteed to still be in the liquid and another level sensor is used to detect a maximum level to prevent a container from overflowing. Further level sensors may be used for determining intermediate fluid levels.

The conductivity of liquids depends strongly on the temperature of the liquid. Temperature compensation is thus essential for a precise conductivity measurement. The temperature sensor is located at the lower end of the conductivity sensor, thermally insulated as far as possible to reduce incorrect measurements due to a self-heating of the sensor.

The conductivity sensor remains permanently in the liquid so that the protection of the installed electronics is elementary. In addition, the sensor shall be manufactured cost-effectively in large quantities. Therefore, the sensor comprises a plastic injection molded housing, which is additionally filled with a hot melt potting compound. The sensor may be directly molded during injection molding, i.e., inserted into the injection mold, the hotmelt potting compound protects the electronics from temperature and pressure during injection molding and also protects against penetration of the liquid.

Direct "overmolding" achieves a housing without potentially critical (in terms of water ingress) joints and generates a tight connection to the electrodes and level sensors protruding into the liquid.

The electrodes for conductivity measurement and the prisms of the optical level sensors have so-called "melting ribs" which melt during injection molding and thus ensure a tight connection.

FIG. 1A shows a vertical arranged sensor system 10 with a view on a front plate 15 of an injection molded housing 16. Sectional planes A-A (FIG. 1B), B-B (FIG. 1C) and C-C (FIG. 1D) are indicated. A connector 4 is arranged on top of the sensor for connecting the sensor system 10 with a cable (not shown) to a controller (not shown). Two level sensors 3 are arranged above each other. The four electrodes of the conductivity sensors 20 are arranged in a row at the lower end of the front plate 15.

The body of the injection molded housing 16 is filled with a hot melt compound 25 for embedding the level sensors 3, conductivity sensors 20 together with an electronic circuit board 5.

FIG. 2 shows a sectional view through a level sensor 3 which is connected to the electronic circuit board 5. A transmitter 31 and a receiver 33 are arranged next to each other on the electronic circuit board 3. Transmitter 31 emits light in the direction of tip 35 of the level sensor 3. Tip 35 of the level sensor is a prism 37 so that light will be reflected onto receiver 33 if air surrounds tip 35 of level sensor 3. In case that a fluid like a liquid surrounds prism 37 the light will no longer—at least partly—be reflected onto receiver 33. Melting ribs 39 are arranged on the outer surface below the tip 35 of level sensor 3. They are used for fixation of level sensor 3 in the injection molded housing 16 during injection molding.

Figure 3C:
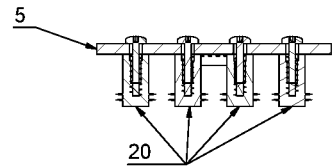
Figure 4:
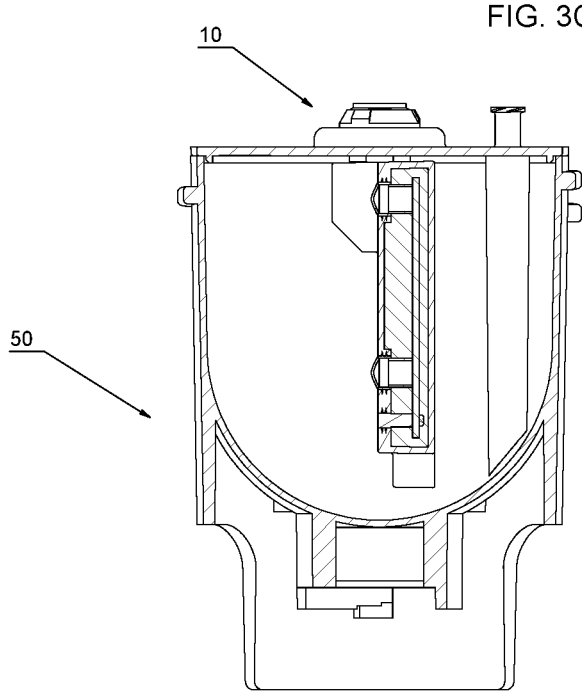
FIG. 4 shows a sensor arranged in a container.

FIGS. 3A-3C show the electronic circuit board 5 without injection molded housing and hot melt compound in a side view (FIG. 3A), a front view (FIG. 3B), and in a view from below (FIG. 3C) without connector 4 (lower part). Level sensors 3, conductivity sensors 20, temperature sensor 40 and connector 4 are all arranged onto and connected to the electronic circuit board FIG. 4 shows a sensor system 10 which is arranged in a container 50.

The advantages of the invention can be summarized as follows:
  Cost effective sensor system regarding its manufacture.
  Simultaneous level, conductivity and temperature monitoring
  No interaction of metals with liquid due to the use of plastic electrodes Alternative approaches may encompass a design using glassy carbon electrodes instead of the conductive plastic. Glassy carbon is an engineering material that does not occur naturally and consists of pure carbon combining the positive properties of vitreous and ceramic materials. The most important properties of said material relate to its good electrical conductivity, high corrosion resistance, high rigidity and strength, extremely good temperature resistance, good biocompatibility and low gas and liquid permeability. The rigidity of glassy carbon is also related to a demanding machining in manufacturing electrodes.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERALS 3 level sensor
4 connector
5 electronic circuit board
10 sensor system
15 front plate
16 injection molded housing
20 conductivity sensor
25 hot melt compound
31 transmitter
33 receiver
35 tip
37 prism
39 melting ribs
40 temperature sensor
50 container

What is claimed is:

1. A sensor system for fluids, comprising:
  two level sensors which are arranged vertically one upon the other on and connected to an electronic circuit board;
  four electrodes of four conductivity sensors which are arranged horizontally next to each other at the bottom of and connected to the electronic circuit board, wherein the four conductivity sensors are arranged below the lower level sensor;
a temperature sensor which is connected to the electronic circuit board; and
a connector for connecting the electronic circuit board to a controller;
wherein the electronic circuit board is embedded in a hot melt compound which is surrounded by an injection molded housing.

2. The system of claim 1, wherein all sensors in the sensor system are made of a conductive plastic.

3. The system of claim 1, wherein the two outer electrodes of the conductivity sensors apply a defined current and the two inner electrodes conductivity sensors measure the current for determining the conductivity of the fluid.

4. The system of claim 1, wherein the at least two level sensors are optical sensors.

5. The system of claim 4, wherein each tip of the at least two level sensors is made of a transparent material.

6. The system of claim 5, wherein the tip of a level sensor is a prism.

7. The system of claim 1, wherein the temperature sensor is located below the conductivity sensors.

8. The system of claim 1, wherein the temperature sensor is thermally insulated from the injection molded housing.

9. A method for monitoring the mixture of fluids, comprising the steps of:
mixing at least two fluids in a container;
measuring conductivity, fluid level and temperature of the mixture with a sensor system for fluids, wherein the sensor system comprises:
at least two level sensors arranged vertically one upon the other and connected to an electronic circuit board;
four electrodes of the at least two level sensors arranged horizontally next to each other at the bottom of and connected to the electronic circuit board;
a temperature sensor connected to the electronic circuit board;
a connector for connecting the electronic circuit board to a controller,
wherein the electronic circuit board is embedded in a hot melt compound which is surrounded by an injection molded housing; and
determining whether the conductivity is in a pre-defined range.

10. The method of claim 9, wherein a ratio of the at least two fluids is adjusted according to the determined conductivity if the measured conductivity is outside the pre-defined range.

* * * * *